INVENTOR.
HOMER J. WOOD,
BY
ATTORNEY

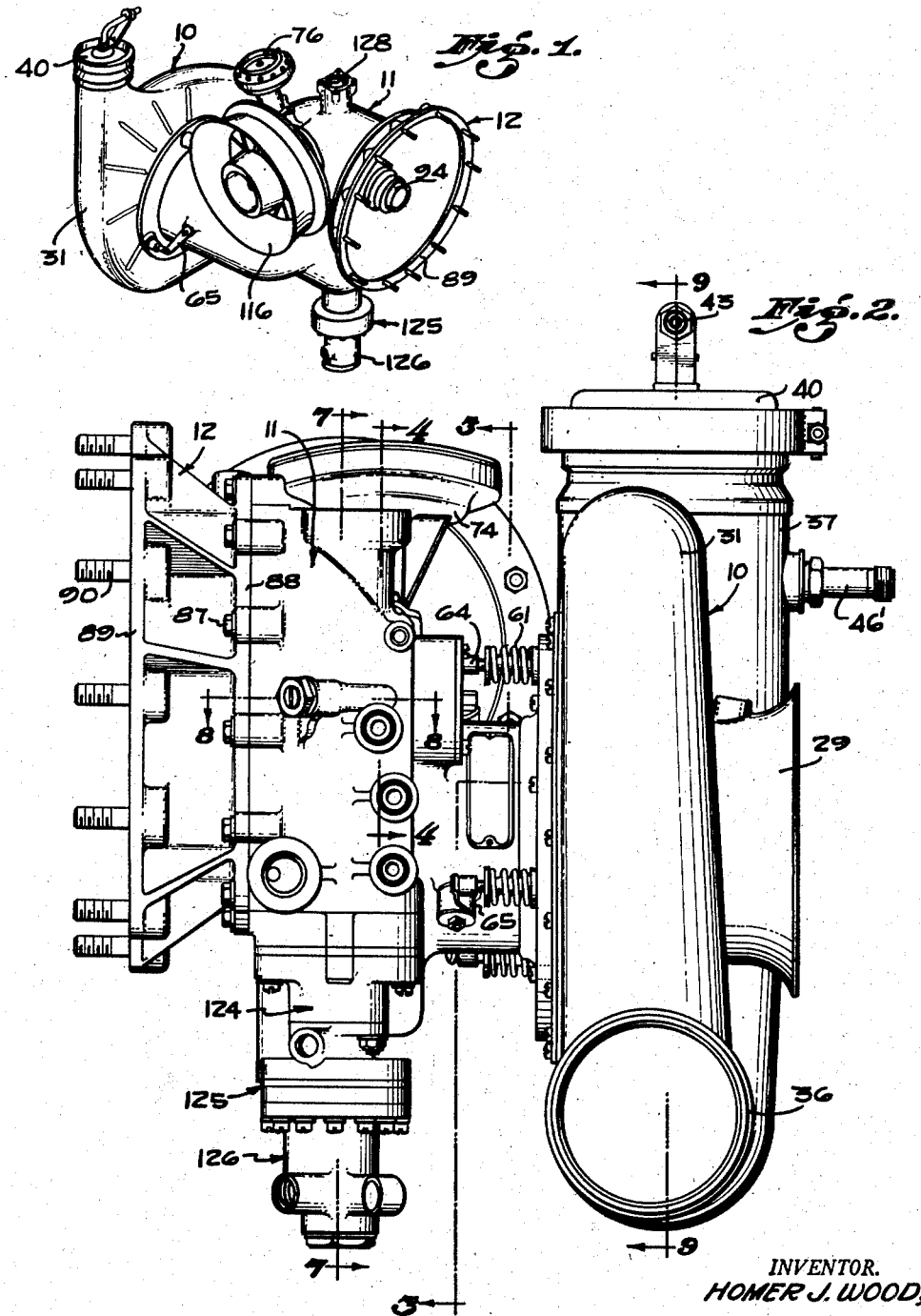

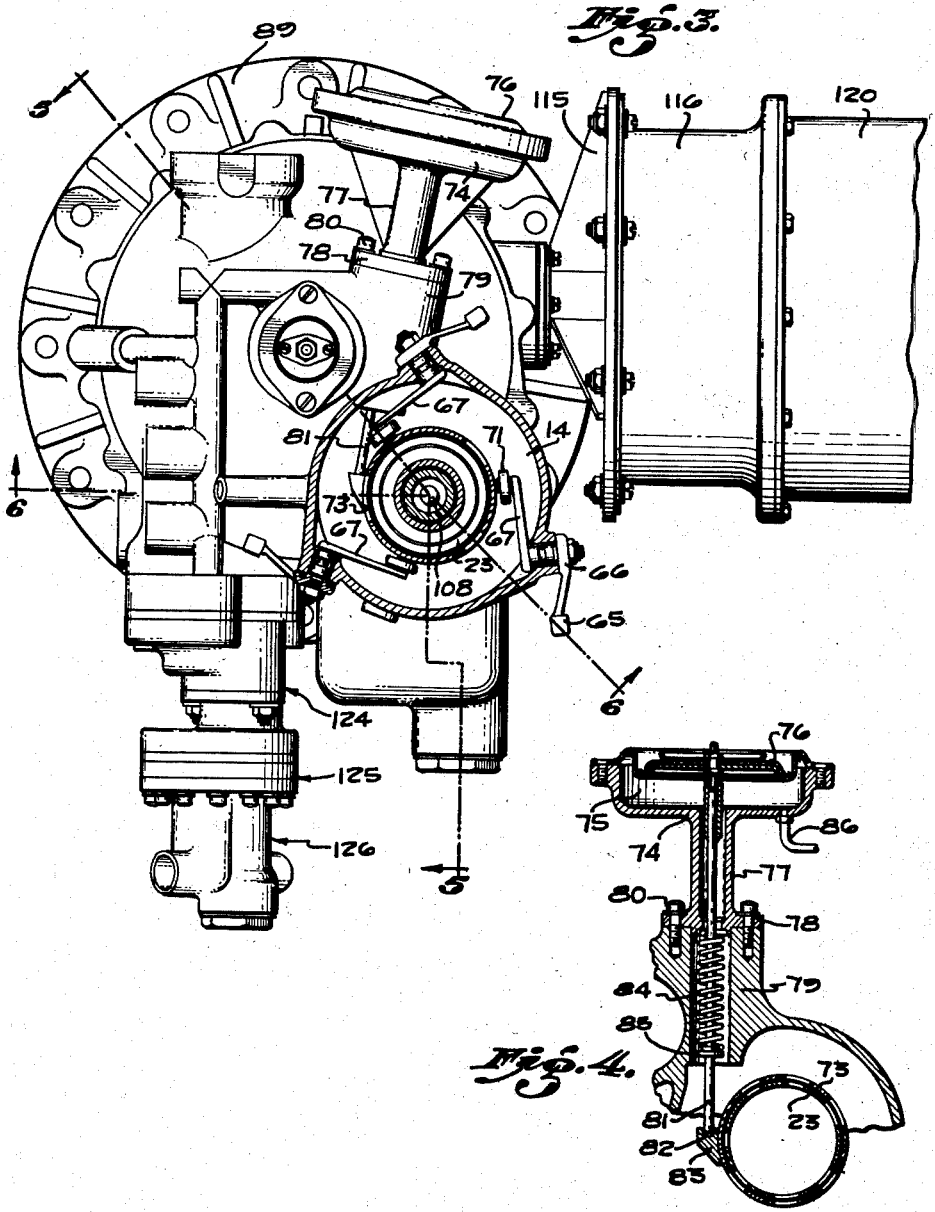

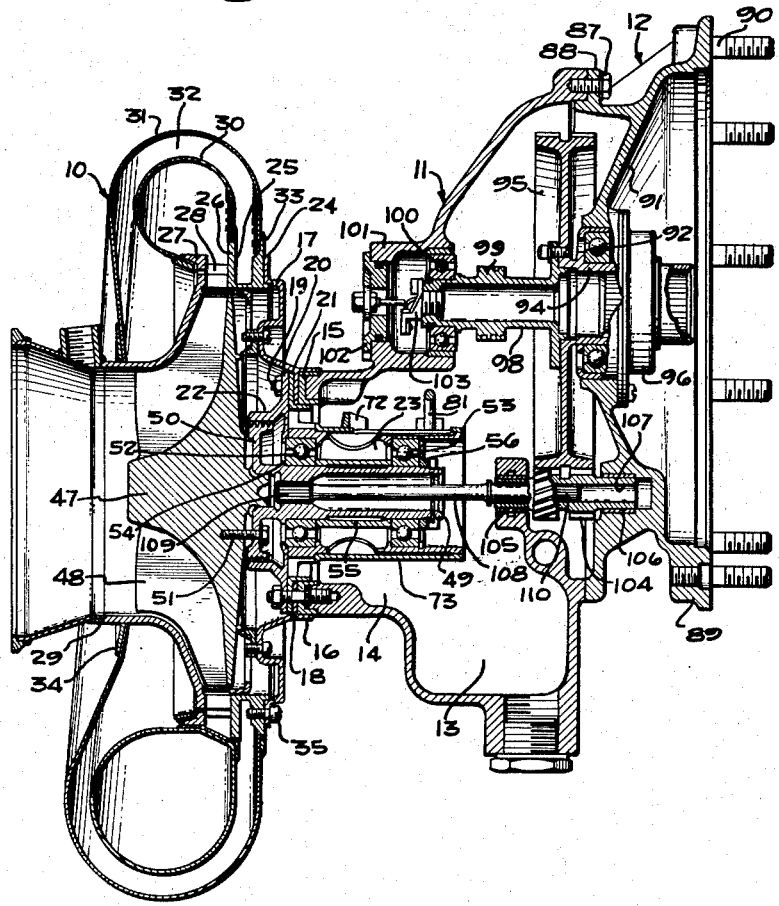

Aug. 6, 1957 H. J. WOOD 2,801,519
GAS TURBINE MOTOR SCROLL STRUCTURE
Filed Feb. 17, 1951 6 Sheets-Sheet 5

INVENTOR.
HOMER J. WOOD,
BY
ATTORNEY

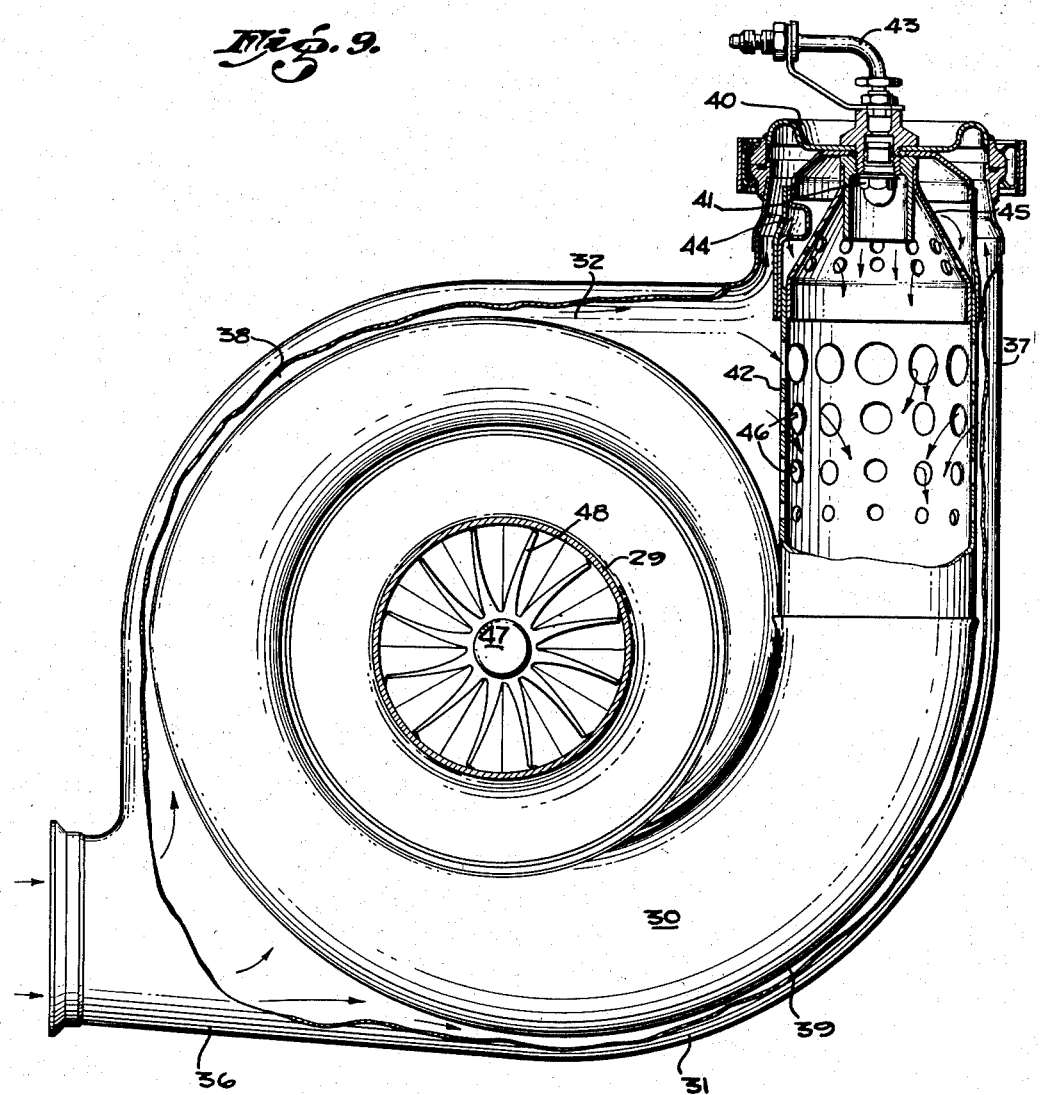

United States Patent Office 2,801,519
Patented Aug. 6, 1957

2,801,519

GAS TURBINE MOTOR SCROLL STRUCTURE

Homer J. Wood, Sherman Oaks, Calif., assignor to The Garrett Corporation, Los Angeles, Calif., a corporation of California Application February 17, 1951, Serial No. 211,460

5 Claims. (Cl. 60—39.66)

The present invention relates generally to a prime mover, and is more particularly concerned with a self contained gas turbine motor which may be supplied with compressed air and fuel from convenient external sources.

While the invention is especially suited for use in aircraft as a source of driving power, it is also susceptible of general application and may be utilized as a remote power source for the direct drive of electrical generators, pumps, fans, and other apparatus.

It is therefore one object of the herein described invention to provide a self-contained gas turbine motor unit of novel construction, which may be utilized as a prime mover and efficient source of power for motivating auxiliaries and other devices.

A further object is to provide automatic control including speed regulating means which embodies novel mechanism for controlling and varying the effective nozzle area of the turbine in response to variations in a sensed medium.

A further object is to provide in a gas turbine of the herein described type, a novel inlet scroll construction which will result in regeneratively cooling the nozzle scroll and nozzle box, substantially reduce radiant heat losses, increase fuel economy, provide increased safety of operation, and reduce fire hazard.

Another object is to provide a turbine motor construction having an accessory housing section positioned between the turbine proper and its mounting flange, this section containing gearing, main bearings and transmission shafts, and further serving as a mounting for auxiliaries to be mechanically driven by the turbine, and which may or may not be cooperatively associated with other devices such as heat exchangers, oil coolers, and the like.

Still another object is concerned with the provision of a unique driving shaft connection between the turbine wheel and associated reduction gearing, which is so arranged as to constitute a torque cushion that will absorb gear vibrations and substantially prevent their being transmitted back to the turbine; which will absorb wheel thrust and prevent its being transmitted to the reduction gear pinion bearing; and which will facilitate assembly and disassembly of the accessory casing and the turbine wheel casing sections.

Further objects of the invention will be brought out in the following part of the specification, wherein detailed description is for the purpose of fully disclosing the invention without placing limitations thereon.

Referring to the accompanying drawings which are for illustrative purposes only:

Fig. 1 is an isometric view generally illustrating a gas turbine motor embodying the features of the present invention;

Fig. 2 is a side elevational view of same, looking towards the fluid inlet connection to the turbine;

Fig. 3 is a transverse section through the accessory housing, taken substantially on line 3—3 of Fig. 2;

Fig. 4 is a fragmentary detail sectional view, showing pressure responsive means for motivating the nozzle area control mechanism, taken substantially on line 4—4 of Fig. 2;

Fig. 5 is a longitudinal section, taken substantially on line 5—5 of Fig. 3;

Fig. 9 is an end view of the turbine end of the motor, certain portions being cut away and other portions being shown in section, taken substantially on line 9—9 of Fig. 2, to disclose details of construction.

Referring generally to the drawings, it will appear from Fig. 1 that the gas turbine motor of the present invention is fabricated and assembled as a self-contained unitary prime mover which may be directly attached to the device or apparatus which it is to drive. The unit is contained within a sectionalized housing or casing composed of a turbine end section 10, an accessory intermediate section 11 and a flanged attaching end section 12, these sections being secured together in end-to-end relation.

Figure 6:
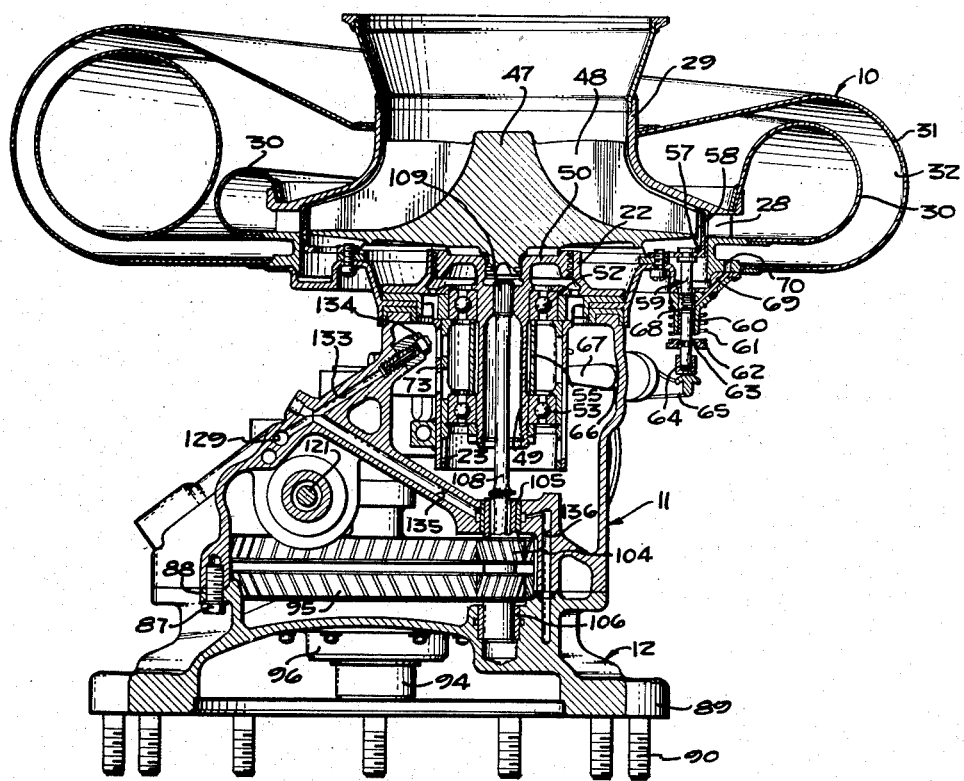
Fig. 6 is also a longitudinal section, taken substantially on line 6—6 of Fig. 3.

From an examination of the accessory housing as shown in Figs. 5 and 6, it will be seen that in general the housing at one end encloses a generally rectangular chamber 13 for housing the reduction gearing assembly, which will hereinafter be described in detail, and a generally tubular portion 14 at its opposite end. The end edge of the portion 14 is fitted with a channel-shaped liner or gasket 15 over which there is slidably fitted an end flange 16 of an annular turbine end wall 17, an abutment flange 18 being provided adjacent the flange 16 for abuttting the gasket 15. These parts are clamped together by securing bolts 19 which also engage peripheral flanges 20 and 21 of a sealing ring 22 and a tubular bearing support 23, respectively.

The turbine end wall 17 is removably secured at its periphery to an annular ring structure 24 which includes an annular nozzle box 25 having spaced side walls 26 and 27 between which there are secured a plurality of inlet nozzle vanes 28. The side wall 27 is inwardly extended and shaped to form a tubular wall structure 29 for the exhaust of the hot gases from the turbine.

Inlet fluid gases are admitted to the nozzle box through a double scroll structure wherein an inner scroll formed by a wall 30 has its marginal edge portions secured to the walls 26 and 27 respectively. An outer wall 31 forms a casing around the inner scroll formed by the wall 30, and the wall 31 is spaced from the wall 30 so as to cooperate therewith in the formation of a fluid flow chamber 32 at the periphery of the innermost scroll. The wall 31 is secured along one of its edge margins to a flange 33 which in this instance is integrally formed with the ring structure 24, and along its other edge margin to a collar ring 34 which extends circumferentially of the tubular wall 29 and is welded or otherwise secured thereto. Securing bolts 35 extend into the flange 33 and thus removably connect this flange with the periphery of the end wall 17.

As shown in Fig. 9, the outer wall 31 comprising the outer scroll casing structure is provided with projecting portions 36 and 37 which are positioned substantially on diametrically opposite sides of the scroll axis and in the present instance are generally tangential. The portion 36 is arranged to form a fluid inlet by which a fluid such as air may enter the chamber 32 and flow through divided passageways 38 and 39 over the periphery of the inner scroll to reach the portion 37.

The portion 37 is arranged to form in effect a combustion chamber which is closed at its projecting end by a suitable cap 40 which serves as a support for a fuel nozzle 41 and a flame tube 42. The nozzle 41 is provided with a connection fitting 43 by which the nozzle may be connected to a suitable source of fuel supply. The head end of the flame tube is provided with a plurality of air admitting passages 44 by which air may flow through a perforated baffle 45 so as to provide primary air for mixing with the fuel which issued from the nozzle 41. Combustion or secondary air is arranged to enter the interior of the flame tube 42 through a plurality of wall perforations 46. The opposite end of the flame tube is connected to the entrance end of the inner scroll so as to conduct hot gases into the scroll for guided flow to the nozzle box 25. The fuel mixture is initially ignited by means of a spark plug 46; as shown in Fig. 2.

In the usual arrangement, the nozzle scroll of a hot gas turbine operates at white hot heat so that there will be large heat losses and concomitant decrease of efficiency. With the arrangement described above, relatively cold air is brought into heat exchange with the hot scroll, thus causing a substantial decrease in its radiant temperature. A considerable part of the radiant heat from the inner scroll is absorbed and the outer scroll is maintained at a materially reduced temperature. This reduced temperature is of particularly vital importance in aircraft as it reduces the fire hazard and possible necessity of having to provide fire proofing bulkheads or shields, thereby saving considerable weight.

It will further be appreciated that by utilizing the heated air, which has passed over the hot inner scroll, for combustion purposes, a regeneration is effected so that there will be a considerable saving of heat losses and a concomitant increase of fuel economy.

Returning now to Figs. 5 and 6, it will be seen that the nozzle box 25 and the tubular wall 29 are operatively associated with a turbine wheel 47 which carries a plurality of vanes 48 which are arranged to be acted upon by the gases discharged from the stationary nozzles formed by the nozzle vanes 28.

The turbine wheel 47 is rotatably mounted, a quill 49 being secured to one side of the turbine wheel so as to project axially therefrom. At its secured end, the quill shaft is formed with an end flange 50 in which securing bolts 51 in circumferentially spaced relation secure the shaft to the wheel hub. This flange at its periphery is grooved for association with the sealing ring 22 so as to form a seal on this side of the turbine wheel.

The quill shaft 49 is supported at longitudinally spaced positions upon anti-friction bearings 52 and 53, the outer races of these bearings being anchored in the tubular bearing support 23, and the inner races of these bearings being secured to the quill shaft by means of the shaft flange 54, the spacer sleeve 55 and the clamping nut 56 having threaded engagement with an end of the quill shaft.

The mechanism for regulating the turbine speed under varying load conditions will now be described. As primarily shown in Fig. 6, a nozzle ring 57 is supported for axial movements, this ring having a peripheral flange 58 which is positioned in the flow path between the nozzle vanes 28 and the wheel vanes 48 so that upon axial movements of the nozzle ring, the effective nozzle area will be changed.

The nozzle ring 57 is supported upon a plurality of stems 59 in circumferentially spaced relation, each of these stems being reciprocably supported in a bearing 60 and normally biased in an outward direction by means of a coil expansion spring 61, one end of this spring being in engagement with the bearing and the other end being in engagement with a retainer 62 which is held in place by a keeper 63 anchored to the associated stem. The extreme end of the stem 59 is fitted with a retainer cap 64 which is arranged to be engaged by an end 65 of rocker arm 66 supported for rocking movement in the wall of accessory section 11. As so mounted, the end 65 is positioned exteriorly of the accessory wall, while the other end 67 is positioned inside the wall of the accessory section 11.

Between its ends, the stem 59 is circumferentially grooved as indicated at 68, this section being positioned within a chamber portion of the bearing structure having communication through passages 69 and 70 with chamber 32 lying between the scroll walls 30 and 31, whereby air pressure from this chamber will act to form a pressure seal around the stem 59.

As shown in Figs. 3 and 5, each end 67 of rocker arms 66 is provided with a small rotatably mounted wheel 71 adapted to bear against an associated cam flight 72, these flights being carried by a concentric rotatably supported sleeve 73 surrounding the tubular bearing support 23.

From the foregoing description, it will be apparent that the springs 61 will normally bias the nozzle ring in such direction that its peripheral flange 58 will be moved so as to increase the flow passage between the vanes 28 and 48, and that in so doing the wheels 71 will be retained in contact engagement with their respectively associated cam flights 72. It will therefore be seen that by rotating the sleeve 73 in one direction or the other, the cam 72 will operate to shift the nozzle ring 57 with regulatory effect. Various means may be utilized for motivating the cam flight movements, and such motivation may be accomplished in response to variations of a sensed medium so as to operate automatically, if desired.

One type of motivating sensing device is illustrated in Fig. 4, wherein pressure variations of a fluid medium are utilized. More specifically, the arrangement includes a housing 74 having a bell shaped end which defines a chamber 75 that is exposed on one side to a diaphragm 76 anchored at its periphery. The housing has a tubular neck portion 77 which is terminated at its end in a mounting flange 78 by which it is secured in axial alignment to the end of a tubular boss 79 by securing bolts 80. Actuating rod 81 is positioned for longitudinal reciprocable movement within the tubular neck 77 and tubular boss 79, the uppermost end of this rod being connected to the diaphragm and at its lowermost end being seated in a recess 82 of a bracket 83 carried by the sleeve 73. The rod 81 is normally biased in a downward direction by a coil spring 84, one end of this spring bearing against the securing end of the tubular neck 77, and at its other end against a collar 85 carried by the rod 81. The action of the spring 84 may be opposed so as to cause upward movement of the rod 81 by applying an upwardly acting pressure on the diaphragm 76. Such a pressure may be initiated by the placing of a fluid under pressure in the chamber 75, a connection 86 being provided by means of which the chamber may be connected to a fluid pressure supply source which may be modulated for control purposes.

Referring again to Fig. 5, the end of the accessory section 11, which is not connected to the turbine, is connected by a plurality of retaining bolts 87 to a connection flange 88 at one end of the end section 12. The opposite end of end section 12 has an attaching flange 89 in which circumferentially spaced stud bolts 90 are anchored, by means of which the entire unit may be attached to a device for power driving purposes. Intermediate the ends of section 12, the section is provided with a conical wall 91 which forms a bearing support for anti-friction bearing 92, the outer race being stationary and anchored in the wall 91, whereas the inner race is secured to a tubular hub 94 of a reduction gear 95. The hub 94 is extended so as to project through a suitable seal 96 so as to position this end to facilitate connection of a driven shaft thereto. For such purpose the projecting end of a tubular hub 94 may be internally grooved to permit a splined connection therewith.

The reduction gear 95 on the opposite side from the tubular hub 94 is connected by screws 97 with a tubular auxiliary driving shaft 98 which carries a driving pinion 99 intermediate its ends and is rotatively supported at its other end in an anti-friction bearing 100 contained in a tubular bearing housing 101. The bearing housing 101 is closed at its outer end by a cover 102, and also serves as an enclosure for an overspeed switch 103 of the mechanical-inertia type which is directly connected to the auxiliary driving shaft 98. This overspeed switch is incorporated in the unit control system in conventional manner.

The gear 95 meshes with a driving pinion 104 which is supported on opposite sides in aligned bearings 105 and 106 supported respectively and forming parts of the accessory section 11 and attaching end section 12. The driving pinion 104 is constructed with a tubular bore 107 which is axially aligned with the quill shaft 49. The quill shaft 49 and driving pinion 104 are interconnected by means of a torque shaft 108 having a splined connection 109 at one end with the quill shaft 49, and at its other end a splined connection 110 with the driving pinion 104.

The utilization of a splined torque shaft as described above provides in effect a cushion between the turbine wheel and the reduction gears which will act to absorb gear vibrations and prevent these vibrations or a substantial portion thereof from being transmitted back to the turbine wheel. Also, wheel thrust which may not have been absorbed in the rotating assembly is prevented from being transmitted to the reduction gear pinion and its bearing support. The assembly and disassembly of the turbine wheel parts and the accessory section is greatly facilitated.

Figure 7:
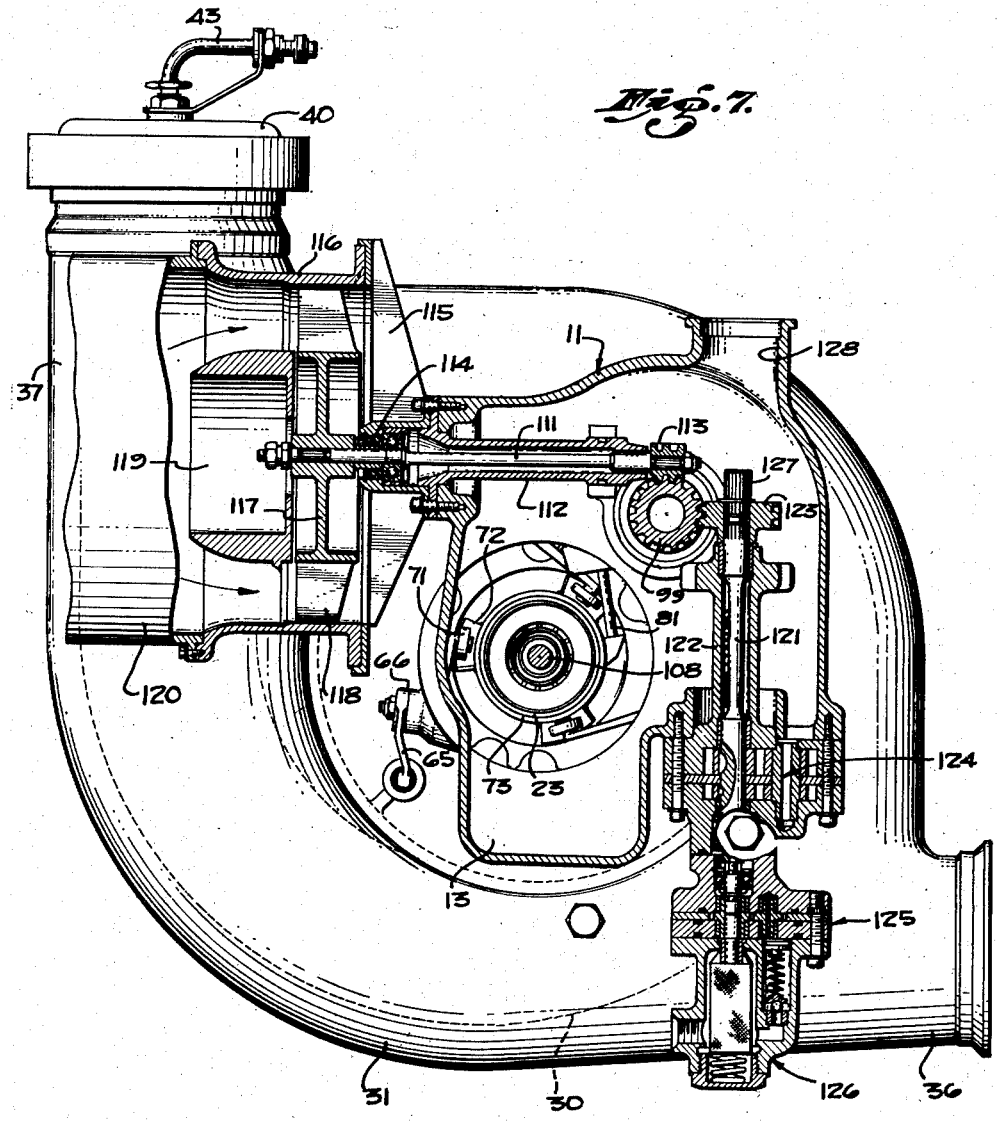
Fig. 7 is a transverse sectional view, showing details of accessory driving connections, taken substantially on line 7—7 of Fig. 2.

As shown in Fig. 7, a plurality of auxiliary drive shafts may be driven from the driving pinion 99. For example, the pinion 99 may be connected with a driving shaft 111 which is rotatively supported in a suitable bearing assembly 112. This shaft is connected at one end with the pinion 99 by means of driving gear 113, and at its other end is carried through a packing gland 114 at the hub portion of a supporting bracket 115. The supporting bracket 115 is secured to one end of a fan housing 116, this housing being operatively associated with an impeller 117 carrying fan blades 118 around its periphery. On the inlet end of the fan housing 116, there is centrally mounted a guide member 119 which deflects the entering air outwardly in a streamlined manner for entering the fan blades 118. This auxiliary fan, as shown in Fig. 1, may simply be utilized for setting up an air circulation over the unit for cooling and other purposes, or may be utilized in connection with other auxiliary equipment such as heat exchangers, oil coolers and the like. In the present instance, there is shown in Figs. 3 and 7 an oil cooler structure 120 which is connected with the fan housing 116 so that the fan will act to draw cooling air through the cooler.

A second shaft 121 is shown as being mounted in a right angularly positioned bearing structure 122, with respect to the bearing assemblage 112. The shaft 121 is connected at one end to the driving pinion 99 by means of a gear 123. At its other end, the shaft 121 is drivingly connected with a conventional gear type oil pump 124 and a gear type fuel pump 125 which has a filter and relieve valve assembly 126 associated therewith. The shaft 121 is provided adjacent the gear 123 with a projecting end 127 which is arranged for connection with a power take-off shaft (not shown) which may be carried out through a take-off opening 128 in the wall structure of the accessory section 11. When the power take-off is not utilized, the opening 128 may be closed by a suitable cover.

Figure 8:
Fig. 8 is a fragmentary view partly in section, taken substantially on line 8—8 of Fig. 2.

Referring to Fig. 8, the outlet from the oil pump is through a passage 129 which is connected with a by-pass passageway 130 which is normally closed by a spring closed ball valve 131. This valve is adjusted to open upon the occurrence of a predetermined excess of pressure, and in its open position permits the oil to flow from passage 129, through the by-pass 130 and thence through an opening 132 back into the interior of the accessory section where it may again be picked up and pumped.

The oil pump 124 supplies forced lubrication to the main bearings, and as shown in Fig. 6 the passage 129 communicates with a supply duct 133 which leads to a nozzle outlet 134 which is directed so as to spray lubricating oil through openings in the sleeve 73 and tubular bearing support 23 onto the turbine wheel bearing 52, and creating a mist of oil which also finds its way into the bearings 53. A branch duct 135 conducts lubricant to bearing 105 and thence through interconnecting duct passage 136 to bearing 106.

The fuel pump 125 is connected to a suitable source of supply (not shown) and has an outlet connection which may be connected through suitable tubing (not shown) so as to supply a fuel to the connection fitting 43 of the combustion chamber.

Although the gas turbine motor of the present invention has been described in considerable detail, it is appreciated that various modifications may suggest themselves to those skilled in the art without departing from the spirit of the invention described herein, and, hence, it is therefore not desired to restrict the invention to the specific form shown or uses mentioned, except to the extent indicated in the appended claims.

I claim:

1. In a hot gas turbine power unit having a plurality of hot gas inlet nozzles: a nozzle scroll for circumferential flow of hot gas, said scroll communicating along its length with said nozzles; an outer scroll spaced from and forming an enclosing casing for the nozzle scroll and cooperating therewith to provide a fluid flow channel at the periphery of the nozzle scroll; means in the outer scroll defining an inlet connection to said fluid flow channel; a flame tube positioned in said fluid flow channel, one end of said tube being connected with the inlet nozzle scroll; a fuel nozzle operatively associated with the other end of said flame tube; and flow passages for admitting fluid from said fluid flow channel to the interior of said flame tube.

2. In a hot gas turbine power unit having a plurality of hot gas inlet nozzles: a nozzle scroll communicating at one side with said nozzles; an outer scroll spaced from and enclosing the nozzle scroll and cooperating therewith to provide a fluid flow channel over the nozzle scroll; projecting portions on opposite sides of the outer scroll extending generally in a tangential direction, one of said portions having an open end defining an inlet and the other portion having a closed end; a fuel nozzle supported in said closed end; and a flame tube containing said nozzle in one end and connected at its other end with said inlet nozzle scroll, said flame tube having openings connecting its interior with said fluid flow channel.

3. In a hot gas turbine power unit having a plurality of circumferentially arranged hot gas inlet nozzles: a tubular wall defining a nozzle feeding chamber extending longitudinally in a generally circumferential direction around said nozzles and having a hot gas inlet at one end from which hot gas is conducted to said nozzles; a combustion chamber connected to the inlet end of said nozzle feeding chamber, and having an inlet; and a fluid supply duct connected to said combustion chamber inlet, said duct including a wall outwardly spaced from and enclosing the wall of said nozzle feeding chamber, said walls cooperating to form divided flow passages in heat transfer relation with respect to the wall of said nozzle feeding chamber.

4. In a turbine power unit having a longitudinal rotational axis: a hot gas inlet nozzle scroll spiralled around the longitudinal axis of the unit; a combustion chamber connected to said nozzle scroll, and having an inlet for a combustion supporting fluid; and a casing surrounding and outwardly spaced from said scroll, said casing having an inlet and an outlet relatively positioned substantially on opposite sides of said unit axis, said outlet being connected to said combustion chamber inlet, whereby combustion supporting fluid is conducted through parallel paths into heat transfer relation with said scroll.

5. In a turbine power unit having a longitudinal rotational axis: a circumferentially extending hot gas inlet nozzle scroll having a longitudinal axis lying substantially in a plane at right angles to the longitudinal axis of the unit; a combustion chamber connected to an end of said nozzle scroll and forming a tangential extension thereto; and means defining an outwardly spaced casing for said nozzle scroll and combustion chamber, and providing a flow passage for supplying combustion air to said combustion chamber, said passage being arranged to conduct the combustion air into heat transfer relation with said nozzle scroll prior to its reaching said combustion chamber.

References Cited in the file of this patent

UNITED STATES PATENTS

| | | |
|---|---|---|
| 1,043,767 | Holzwarth | Nov. 5, 1912 |
| 1,613,868 | Birmann | Jan. 11, 1927 |
| 2,244,467 | Lysholm | June 3, 1941 |
| 2,389,040 | Gottlieb | Nov. 13, 1945 |
| 2,460,523 | Möller | Feb. 1, 1949 |
| 2,490,784 | Davenport | Dec. 13, 1949 |
| 2,503,914 | Linn | Apr. 11, 1950 |
| 2,553,867 | Parducci | May 22, 1951 |
| 2,611,241 | Schulz | Sept. 23, 1952 |
| 2,611,242 | Bell | Sept. 23, 1952 |
| 2,658,338 | Leduc | Nov. 10, 1953 |
| 2,721,445 | Giliberty | Oct. 25, 1955 |

FOREIGN PATENTS

| | | |
|---|---|---|
| 221,714 | Great Britain | Sept. 18, 1924 |
| 290,014 | Great Britain | May 10, 1928 |
| 456,980 | Great Britain | Nov. 16, 1936 |